US006502618B1

United States Patent
Kane et al.

(12) 
(10) Patent No.: US 6,502,618 B1
(45) Date of Patent: Jan. 7, 2003

(54) DUAL RING TIRE INFLATOR WITH SPLITTABLE SUPPORT PLATE

(75) Inventors: John P. Kane, Sterling Heights; Karl D. Sachs, Birmingham, both of MI (US)

(73) Assignee: Burke E. Porter Machinery Company, Grand Rapids, MI (US)

( * ) Notice: Subject to any disclaimer, the term of this patent is extended or adjusted under 35 U.S.C. 154(b) by 0 days.

(21) Appl. No.: 09/621,883

(22) Filed: Jul. 21, 2000

(51) Int. Cl.[7] ............................................. B60C 25/132
(52) U.S. Cl. ...................................... 157/1.2; 157/1.1
(58) Field of Search .............................. 157/1, 1.1, 1.11, 157/1.17, 1.2, 1.21, 14–21; 141/38; 29/894.31

(56) References Cited

U.S. PATENT DOCUMENTS

| | | | |
|---|---|---|---|
| 3,461,938 A | 8/1969 | Mueller | 157/1.1 |
| 3,741,271 A | 6/1973 | Ross et al. | 157/1.1 |
| 3,978,903 A | 9/1976 | Mueller et al. | 157/1.2 |
| 4,183,392 A | 1/1980 | Kane | 157/1.1 |
| 4,735,250 A | 4/1988 | Kane | 157/1.1 |
| 4,834,159 A | 5/1989 | Burger | 157/1 |
| 4,947,919 A | 8/1990 | Timlin | 157/1.24 |
| 5,035,274 A | 7/1991 | Kinnick et al. | 157/1.1 |
| 5,146,969 A * | 9/1992 | Kawabe et al. | 157/1.1 |
| 5,170,828 A | 12/1992 | Curcuri | 157/1 |
| 5,758,703 A | 6/1998 | Mimura | 157/1.28 |
| 5,826,319 A | 10/1998 | Colwell et al. | 29/407.04 |
| 5,876,501 A | 3/1999 | Doan | 118/679 |
| 5,940,960 A | 8/1999 | Doan et al. | 29/714 |
| 5,980,083 A | 11/1999 | Patte et al. | 364/468.01 |
| 6,029,716 A | 2/2000 | Hawk | 141/38 |
| 6,148,892 A | 11/2000 | Koerner et al. | 157/1.1 |

* cited by examiner

Primary Examiner—D. S. Meislin
(74) Attorney, Agent, or Firm—Young & Basile, P.C.

(57) ABSTRACT

An apparatus for inflating a tire mounted on a rim can include a conveyor for transporting a tire mounted on a rim to a predetermined position at a tire inflating work station. The conveyor can include carrier surfaces spaced laterally with respect to one another along a path of travel for engaging the tire and rim for transport. The carrier surfaces are moveable along the path of travel and moveable vertically between a raised transport position and a lowered transfer position. A support surface at the tire inflating workstation has at least two portions. The portions include at least one interlocking joint for holding the portions of the support surface in sealing engagement with respect to one another during an inflation process. An apparatus for inflating a tire mounted on a rim can include a reciprocal inflation head moveable from a first position spaced from the tire to a second position engagable with the side wall of the tire for communicating pressurized fluid to inflate the tire on the rim. At least two concentric seals are selectively moveable with respect to one another to bring at least one seal into sealing engagement with a side wall of the tire to be inflated. A mechanism for moving at least one seal with respect to the other seal is provided for selectively presenting one seal in operable position for engaging a side wall of the tire to be inflated.

30 Claims, 8 Drawing Sheets

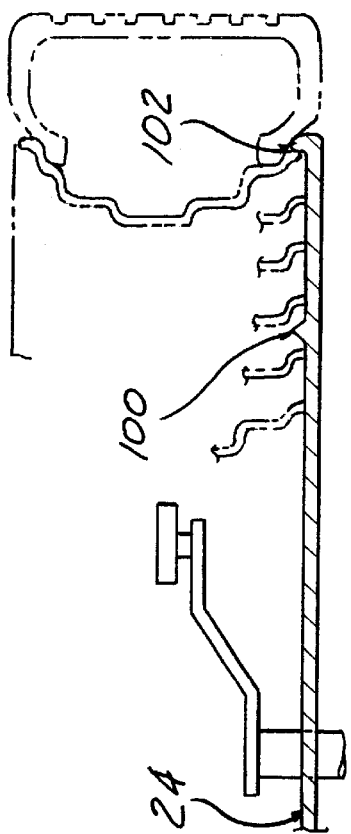
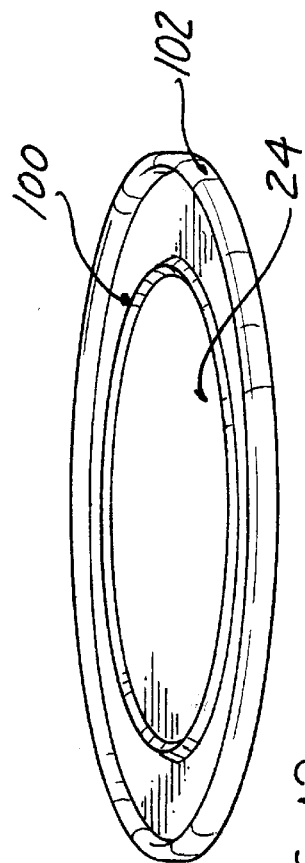
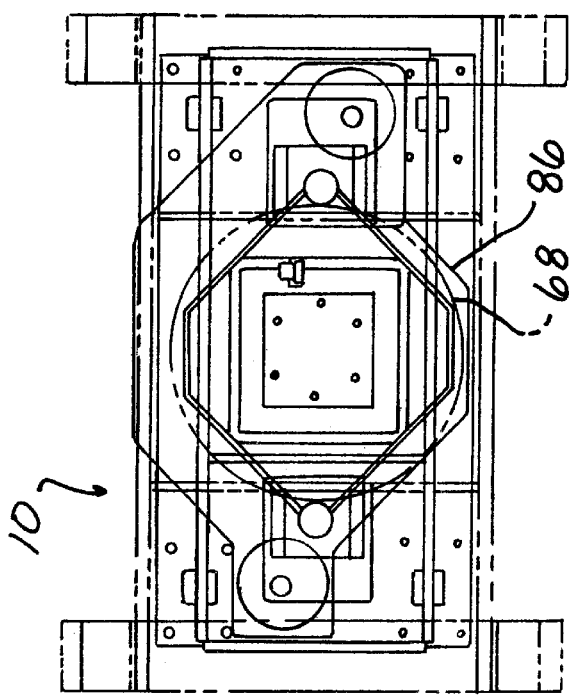

DUAL RING TIRE INFLATOR WITH SPLITTABLE SUPPORT PLATE

FIELD OF THE INVENTION

The present invention relates to an apparatus for inflating a tire mounted on a rim, and more particularly a reciprocal inflation head having at least two concentric seals selectively moveable with respect to one another to bring at least one seal into sealing engagement with a side wall of tires of different sizes, and alternatively or additionally, a splittable support surface at the tire inflating work station where a portion of the support surface is moveable transversely with respect to a path of travel on a conveyor for allowing transfer of a tire and rim transported by the conveyor to the support surface.

BACKGROUND OF THE INVENTION

Mounting tubeless tires on wheel rims by automobile manufacturers is normally accomplished by high production devices where a wheel is placed on a conveyor, the tire is preliminary positioned relative to the rim, and the rim and tire are conveyed from station to station. At the various stations, the tire can be soaped, forced over the rim, and mounted intermediate the upper and lower lips of the rim. Optionally, the rim and tire may be rotated relative to each other in accordance with previously applied reference points. The tire is inflated to a predetermined pressure at an inflation work station.

To reduce the duration of time required for inflation, it is known to impose an annular axial force on one of the tire side walls which causes the other tire side wall to seal against a support surface while the deflected side wall bead is displaced from the lip of the rim. An inflation chamber is defined by the support surface and the tire, and compressed air is forced into the tire around the displaced side wall bead. After the desired pressure is achieved in the inflation chamber, the deflected tire side wall is permitted to expand to seat the bead against the corresponding lip of the rim to maintain the inflation pressure. This process permits inflation of the tire to be accomplished in a very short period of time.

An inflation chamber for a high production tire inflation devices includes the interior of the tire, where pressurization of the chamber produces the desired pressure within the tire. To define the inflation chamber, an annular tire side wall seal is normally employed to engage the tire side wall and to displace the bead associated with the side wall from the lip of the rim. Sufficient pressure is applied to seal the opposite tire side wall against the support surface. Pressurizing the chamber drives the bead associated with the opposite tire side wall into engagement with the lip of the rim while the deflected tire side wall maintains an open passage until the pressurization of the inflation chamber is complete. The deflected tire side wall is then permitted to expand to seat the associated bead against the lip of the rim to maintain the inflation pressure.

Alternatively, an annular inflation chamber can be defined to include the interior of the tire, an annular wheel seal employed to engage the rim, and an annular tire side wall seal employed to engage the tire side wall for displacing the side wall with respect to the lip of the rim. In this configuration, no support surface or sealing device is associated with the opposite side of the tire as a seal, since the seal opposite from the displaced side wall is achieved by the engagement of the tire bead with the lip of the rim during the inflation process. Typically, the side wall engaging seal and the wheel rim engaging device are displace able with respect to each other to produce the desired sequence of operation for this type of annular inflation chamber.

Known tire inflation devices typically can handle only a limited variation in tire sizes due to the predetermined diameter of the annular tire side wall seal used to define the inflation chamber and deflect the tire side wall during the inflation process. Most tire inflation devices require the size of the sealing structure for the rim and/or tire side wall to be changed when different sizes of wheel rims and tires are to be inflated. Changeover of the inflation line from one tire size to another is time consuming and expensive. Furthermore, there is often a need to mix tire sizes on an inflation line as required for production purposes.

SUMMARY OF THE INVENTION

It is desirable in the present invention to provide a tire inflation apparatus capable of inflating various tire sizes automatically without requiring changeover of the sealing structure. In addition, it is desirable in the present invention to provide a tire inflation apparatus capable of automatically inflating a mix of tire sizes on an inflation line, where large differences may occur between the sizes, so that the present invention can automatically accommodate different rim and tire sizes.

An apparatus for inflating a tire mounted on a rim according to the present invention can include a conveyor for transporting a tire mounted on a rim to a predetermined position at a tire inflating work station. The conveyor can have carrier surfaces spaced laterally with respect to one another along the path of travel for engaging the tire and rim for transport. The carrier surfaces are moveable along the path of travel and moveable vertically between a raised transport position and a lowered transfer position. A support surface at the tire inflating work station is provided. The support surface has at least two portions. The portions include at least one interlocking joint for holding the portions of the support surface in sealing engagement with respect to one another during an inflation process. At least one portion of the support surface is moveable transversely with respect to the path of travel of the conveyor for allowing transfer of the tire and rim transported by the conveyor to the support surface as the conveyor moves between the raised transport position and the lowered transfer position.

An apparatus for inflating a tire mounted on a rim according to the present invention can include a reciprocal inflation head moveable from a first position spaced from the tire to a second position engageable with a side wall of the tire for communicating pressurized fluid to inflate the tire on the rim. The inflation head has at least two concentric seals selectably moveable with respect to one another to bring at least one seal into sealing engagement with a side wall of the tire. Means are provided for moving at least one seal with respect to the other seal for selectively presenting one seal in operable position for engaging a side wall of the tire to be inflated. The appropriate seal is selectively presented to correspond to the tire and rim size to be inflated at the inflating work station.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 9 is a plan view of the reciprocal inflation head;

FIG. 11 is a simplified schematic view of a support surface or pallet having a plurality of upwardly extending sealing flanges for engaging a lower side wall of different size tires for creating a sealed chamber during the inflation process; and FIG. 12 is a perspective view of the plate or pallet illustrated in FIG. 11.

DETAILED DESCRIPTION OF THE PREFERRED EMBODIMENT

Figure 1:
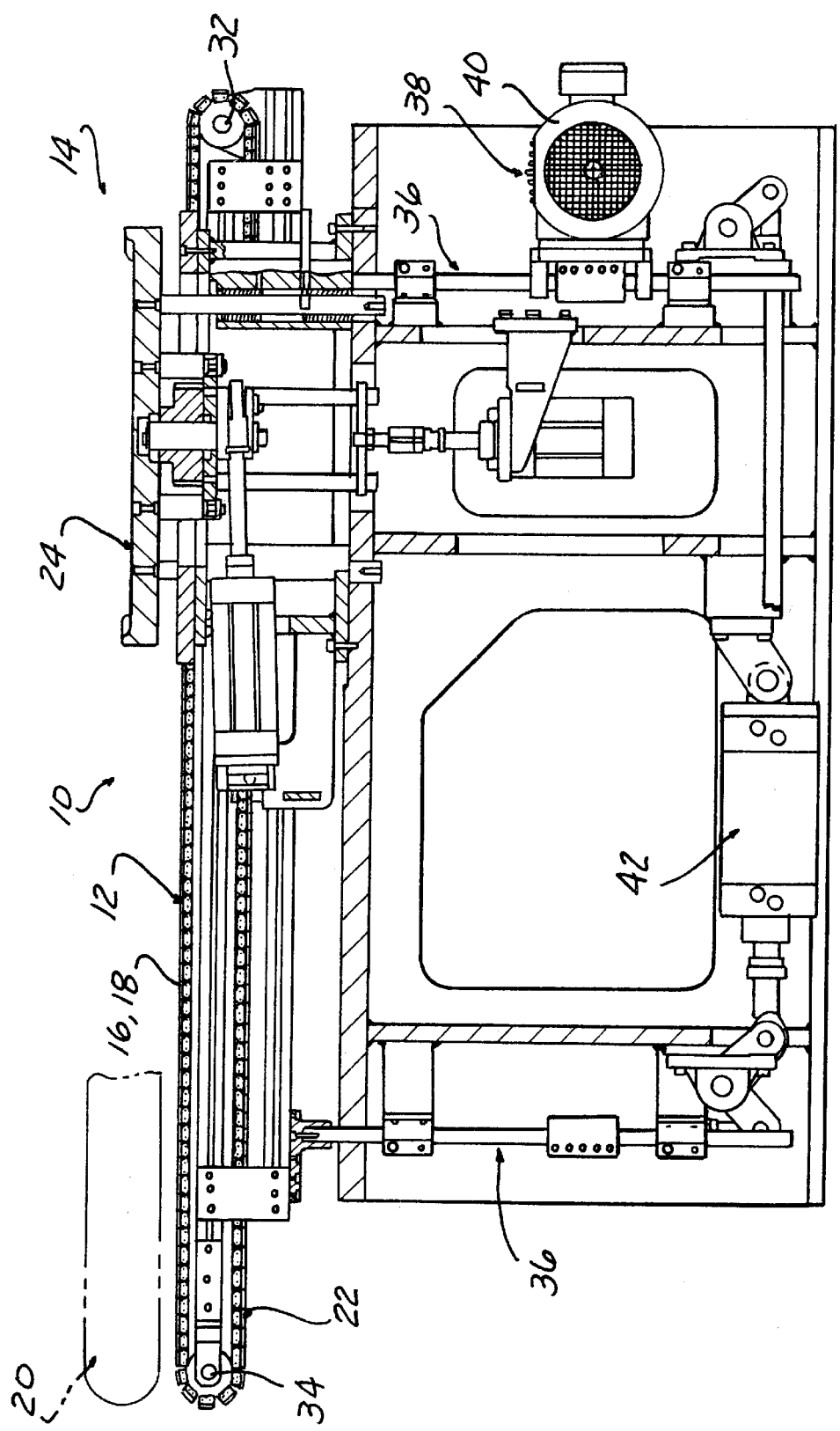
FIG. 1 is a side elevational view of a conveyor for transporting a tire mounted on a rim to a predetermined position at a tire inflating work station with a support surface for receiving the tire and rim.
Figure 2:
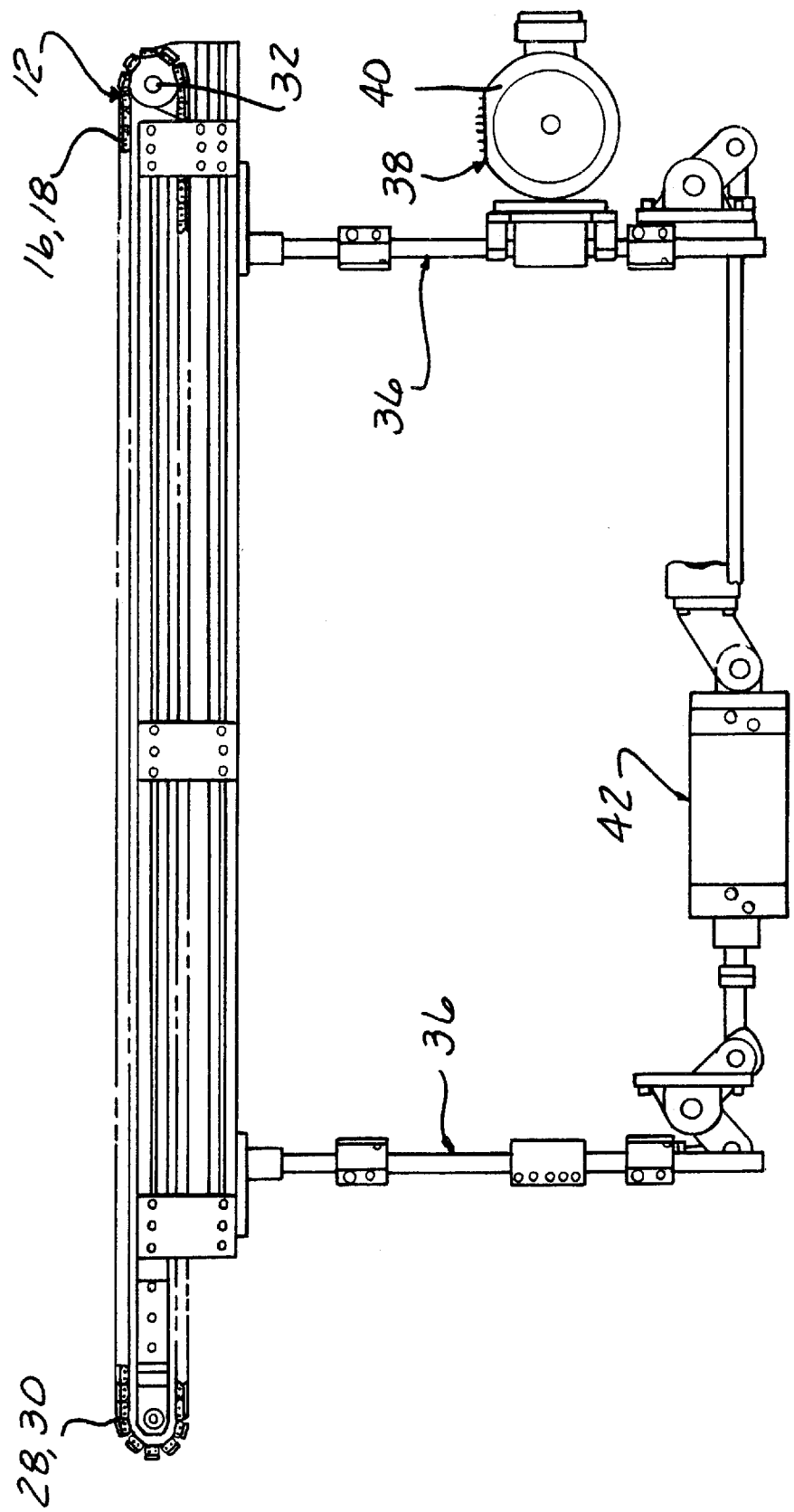
FIG. 2 is a side elevational view of a frame supporting the conveyor and means for moving the frame vertically between a raised transport position and a lowered transport position.
Figure 3:
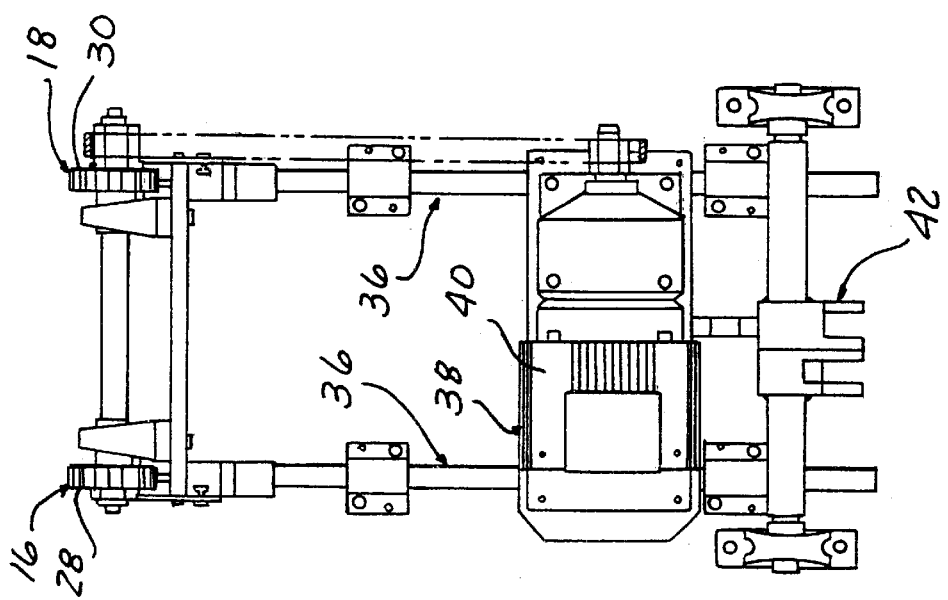
FIG. 3 is an end elevational view of the conveyor illustrated in FIG. 2.

Referring to FIGS. 1 through 3, a lower portion of an apparatus 10 for inflating a tire mounted on a rim is illustrated. The lower portion of the apparatus 10 preferably includes a conveyor 12 for transporting a tire mounted on a rim to a predetermined position at a tire inflating work station 14. The conveyor 10 has carrier surfaces 16, 18 spaced laterally with respect to one another along a path of travel for engaging the tire and rim during transport. The carrier surfaces 16, 18 are moveable along the path of travel, and are also moveable vertically between a raised transport position (partially shown in phantom at 20), and a lowered transfer position shown in solid line at 22. A support surface 24 is disposed at the tire inflating work station 14 for receiving the tire mounted on the rim to be inflated. The support surface 24 can include at least two portions with at least one interlocking joint 26 for holding the portions of the support surface 24 in sealing engagement with respect to one another during an inflation process. Preferably at least one portion of the support surface 24 is moveable transversely with respect to the path of travel of the conveyor 12 for allowing transfer of the tire and rim transported by the conveyor 12 to the support surface 24 as the conveyor 12 moves between the raised transport position 20 and the lowered transfer position 22.

The carrier surfaces 16, 18 of the conveyor 12 can include two endless conveying surfaces 28, 30 spaced apart from one another and operably engagable with a drive shaft 32 and an idler wheel 34. A vertically reciprocal frame 36 supports the drive shaft 32 and idler wheel or pulley 34. The frame 36 is moveable between the raised transport position 20 and the lowered transfer position 22. Means 38 is provided for moving the carrier surfaces 16, 18 along the path of travel. The moving means 38 can include an electric motor 40 operatively connected to rotate the drive shaft 32. Means 42 is provided for reciprocating the frame vertically between the raised transport position 20 and the lowered transport position 22. The reciprocating means 42 can include a fluid operated actuator, such as a pneumatic or hydraulic, double acting cylinder for driving the frame 36 between the raised and lowered positions.

Figure 4:
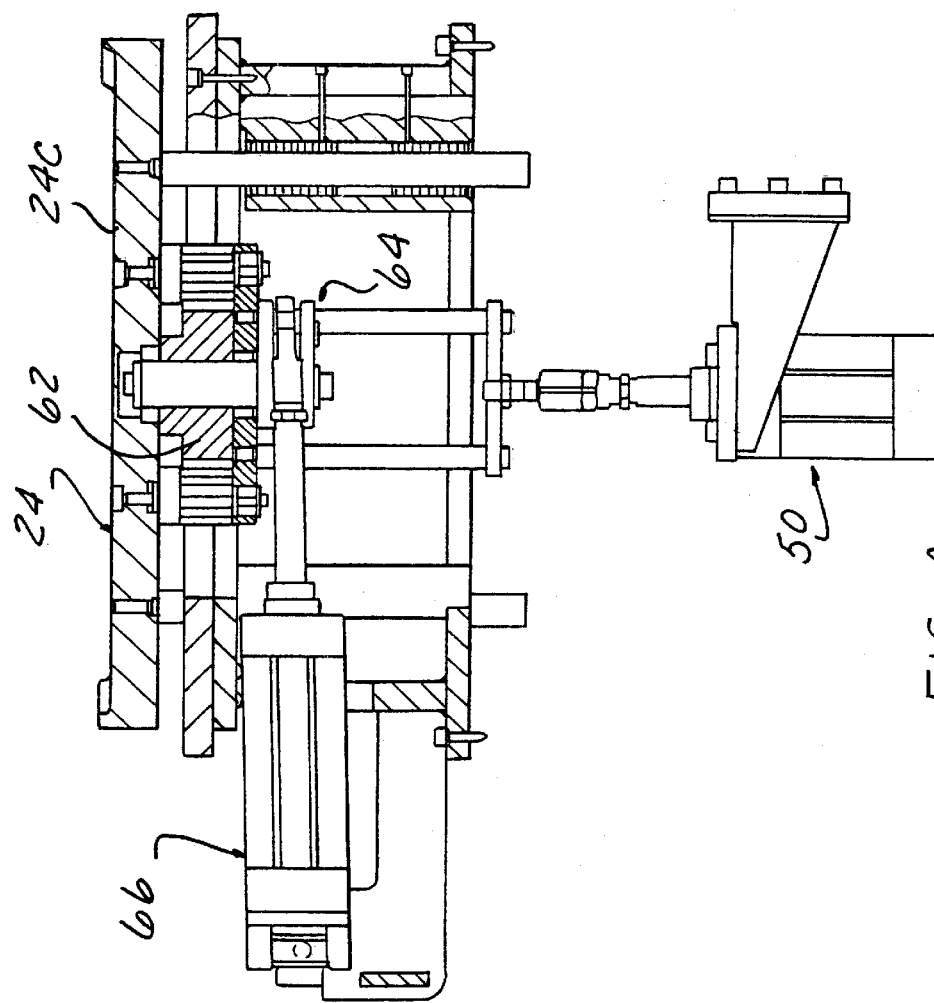
FIG. 4 is a side cross sectional view of the support surface at the tire inflating work station for receiving a tire mounted on a rim with means for moving one portion of the support surface between a locked position and an unlocked position with respect to the other portion of the support surface.
Figure 5:
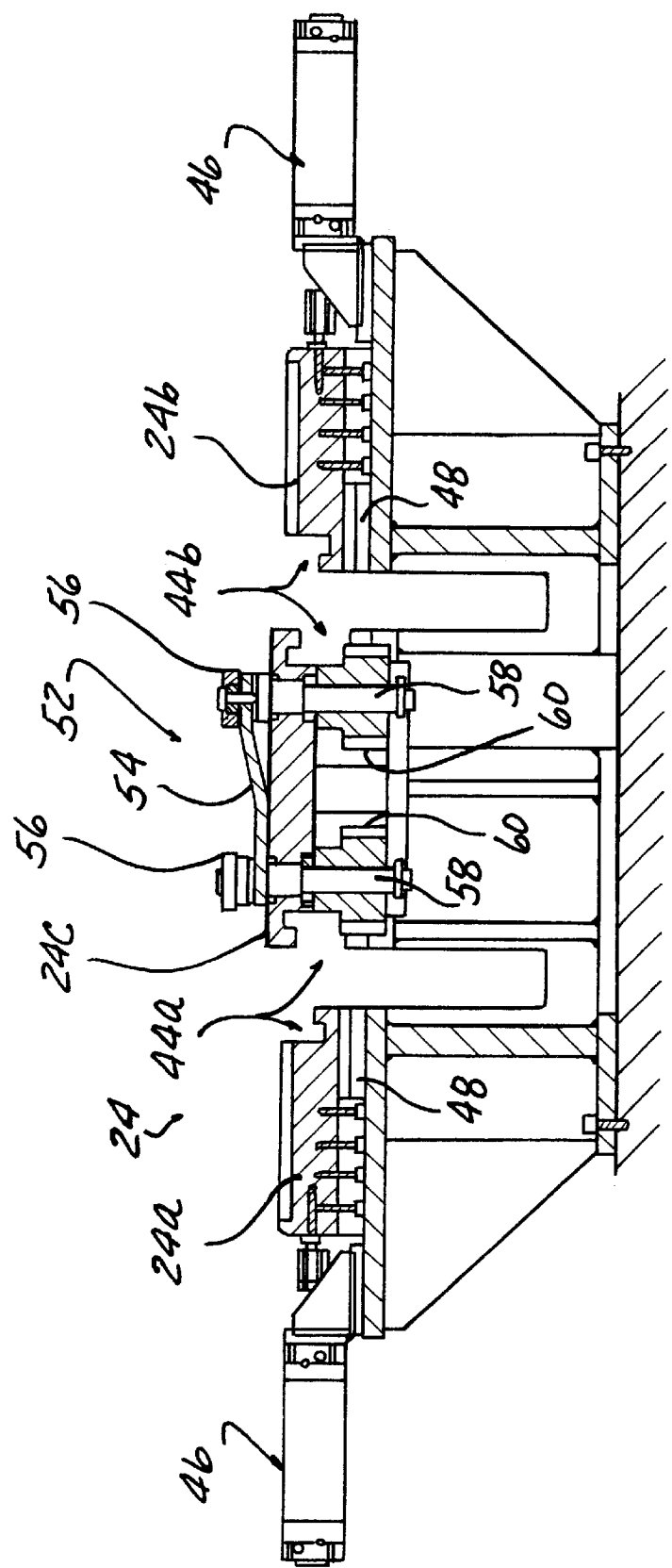
FIG. 5 is an end cross sectional view of the support surface with means for moving at least one portion of the support surface transversely with respect to the other portion of the support surface.
Figure 6:
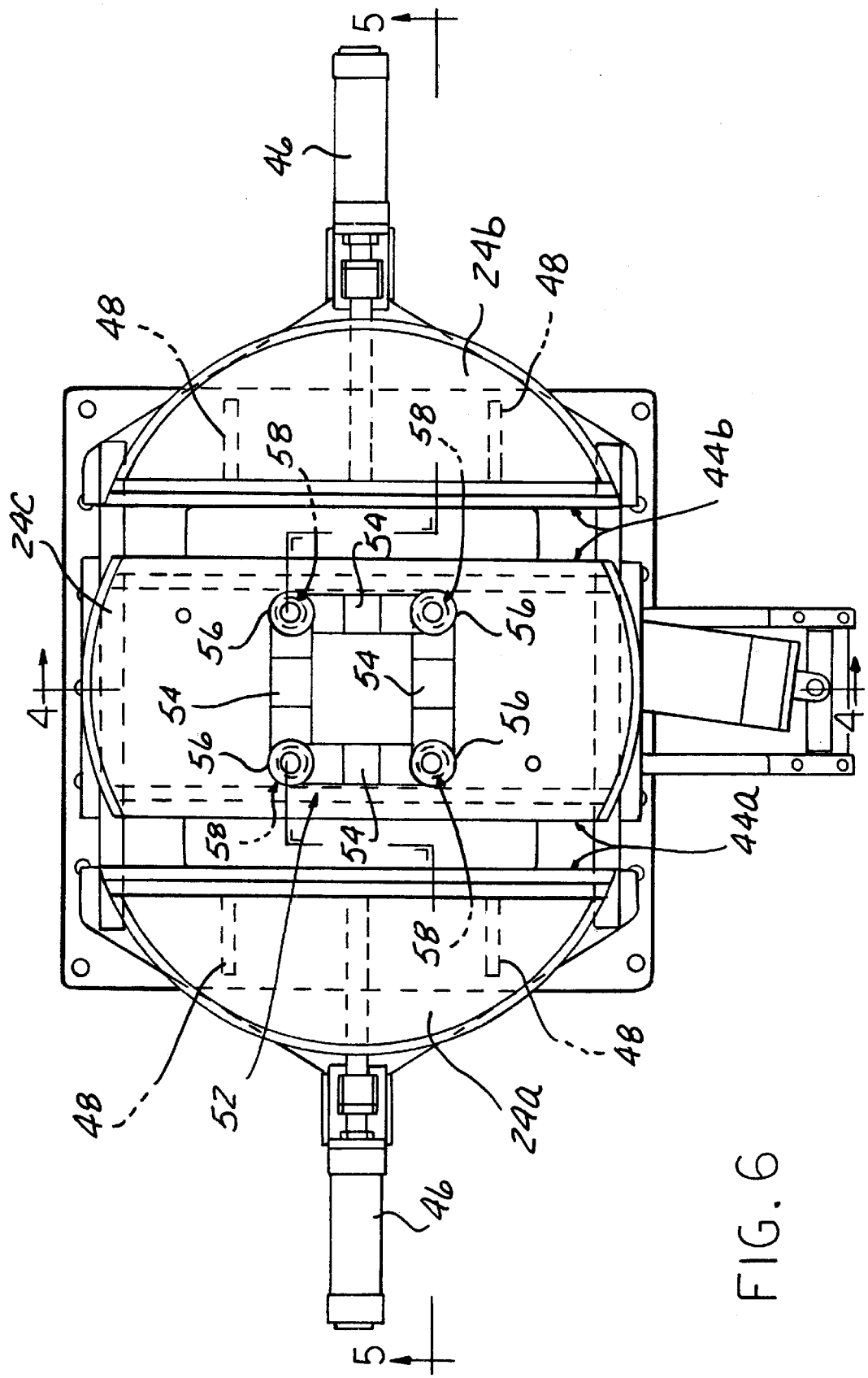
FIG. 6 is a plan view of the support surface at the tire inflating work station.
Figure 8:
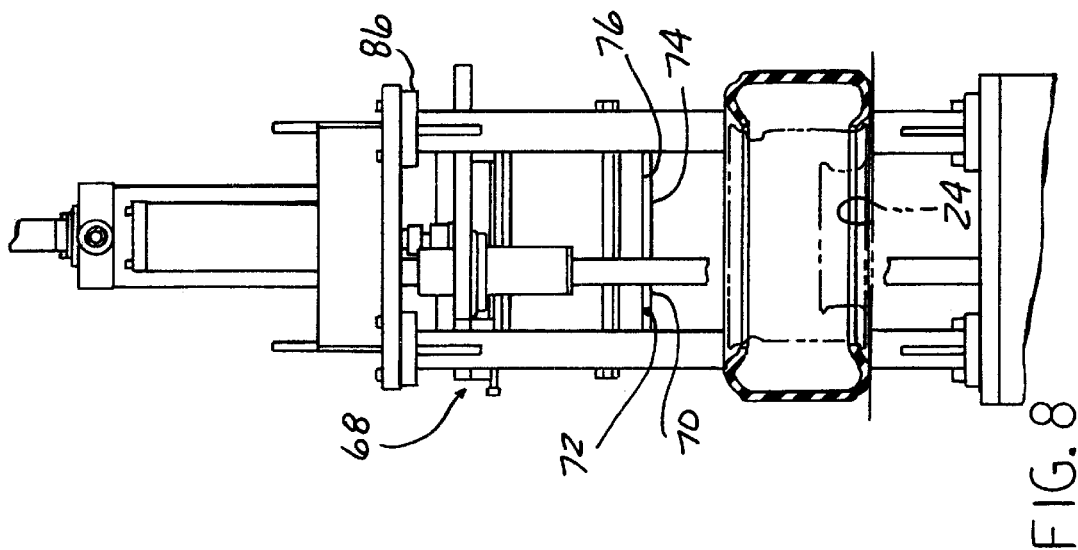
FIG. 8 is an end elevational view of the reciprocal inflation head illustrated in FIG. 7.

Referring now to FIGS. 1, and 4 through 6, the support surface 24 operable engages and supports a tire mounted on a rim at a predetermined position at the tire inflating work station 14. The support surface 24 is capable of creating a seal with respect to the lower side wall of a tire when the opposite side wall of the tire is engaged and deflected by annular axial force imposed by an annular inflation chamber to be described in greater detail below with respect to FIGS. 7 through 10. The support surface can include at least two portions, and preferably three portions 24a, 24b, 24c as best seen in FIGS. 5 and 6. Two end portions 24a, 24b are disposed on opposite sides of a central portion 24c of the support surface 24. Each end portion 24a, 24b has an interlocking joint 44a, 44b with respect to the central portion 24c of the support surface 24 for holding the separate portions 24a, 24b, 24c of the support surface 24 in sealing engagement with respect to one another during an inflation process. Each end portion, 24a, 24b is moveable transversely toward and away from the central portion 24c for allowing passage of the conveyor 12 between the central portion 24c and the end portions 24a, 24b as the conveyor 12 moves between the raised and lowered positions 20, 22 respectively. Drive means 46 is provided for driving each end portion 24a, 24b of the support surface 24 transversely with respect to the path of travel for the conveyor 12. The end portions 24a, 24b of the support surface 24 are moved along one or more guide rails 48 by the drive means 46.

As best seen in FIG. 5, the central portion 24c of the support surface 24 is moveable vertically between a locked position (not shown) and an unlocked position with respect to the end portions 24a, 24b. In the transversely retracted position illustrated in FIG. 5, the conveyor 12 is permitted to move between the end portions 24a, 24b and the center portion 24c as the conveyor 12 moves between the raised position 20 and the lowered position 22. When the end portions 24a, 24b are extended toward the central portion 24c to align the interlocking joints 44a, 44b with respect to the corresponding interlocking tongue and grooves formed on the central portion 24c, the central portion 24c can be moved from the unlocked position to the locked position to engage the interlocking joints 44a, 44b with respect to the end portions 24a, 24b to form a rigid, sealed support surface 24 during the inflation process. As best seen in FIG. 4, reciprocal means 50 are provided for moving the central portion 24c of the support surface 24 between the locked and unlocked positions. Rim centering means 52 is provided mounted to the support surface 24. The rim centering means 52 can include at least one crank arm 54 having a cam surface or roller 56 operably positioned on an outer end for engagement with an interior surface of the rim to be centered. A pivot shaft 58 of the crank arm 54 can pass through the support surface 24. A pinion gear 60 can be connected to an opposite end of the pivot shaft 58 for operable engagement by a drive gear 62. The drive gear 62 can be driven through at least a predetermined angular rotation for centering the rim with respect to the support surface 24 by any appropriate drive mechanism, such as crank arm 64 and reciprocal actuator 66.

Figure 7:
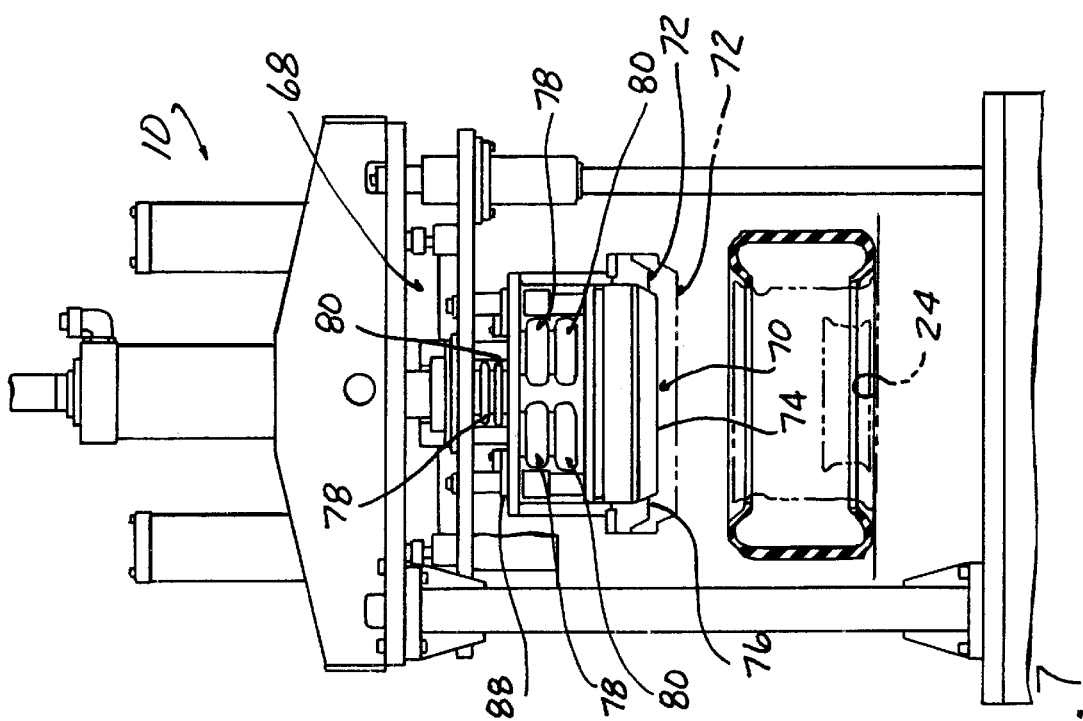
FIG. 7 is a side elevational view of a reciprocal inflation head at the tire inflating work station moveable from a first position spaced from the tire and rim to a second position engagable with a side wall of the tire supported on the support surface to be inflated.

Referring now to FIGS. 7 through 10, an upper portion of the apparatus 10 for inflating a tire mounted on a rim is illustrated. A reciprocal inflation head 68 is moveable from a first position spaced from the tire to a second position engagable with a side wall of the tire for communicating pressurized fluid to inflate the tire on the rim. The head 68 has at least two concentric annular seals 70, 72 moveable with respect to one another to bring at least one seal 70 or 72 into sealing engagement with a side wall of the tire to be inflated. The seals 70, 72 are selectably moved depending on the size of the tire to be inflated. By way of example and not limitation, the inner or smaller diameter seal 70 can be used to inflate tire diameters of between 14 inches to 16 inches inclusive, while the outer or larger diameter annual seal 72 can be used to inflate tire diameters of between 17 inches to 19 inches inclusive. Means 74 is provided for moving at least one seal 72 with respect to the other seal 70 for selectably presenting one seal 70 or 72 in operable position for engaging a side wall of the tire to be inflated. The inflation head 68 can include a first circular wall 74 extending outwardly from the inflation head 68 and supporting a first seal 70 for operable engagement with the side wall of the tire to be inflated. A second circular wall 76 is reciprocally mounted with respect to the inflation head 68 for movement between an extended position (shown in phantom in FIG. 7) and a retracted position (shown in solid line in FIG. 7). The second circular wall 76 supports a second seal 72 for operable engagement with the side wall of the tire to be inflated. The first seal 70 is positioned for operable engagement with a first size tire to be inflated when the second circular wall 76 is in the retracted position. The second seal 72 is positioned for operable engagement with a second size tire to be inflated when the second circular wall 76 is in the extended position. The illustrated embodiment in FIG. 7 illustrates the first seal 70 for use with a first size tire which is smaller than a second size tire to be operably engaged by the second seal 72.

Figure 10:
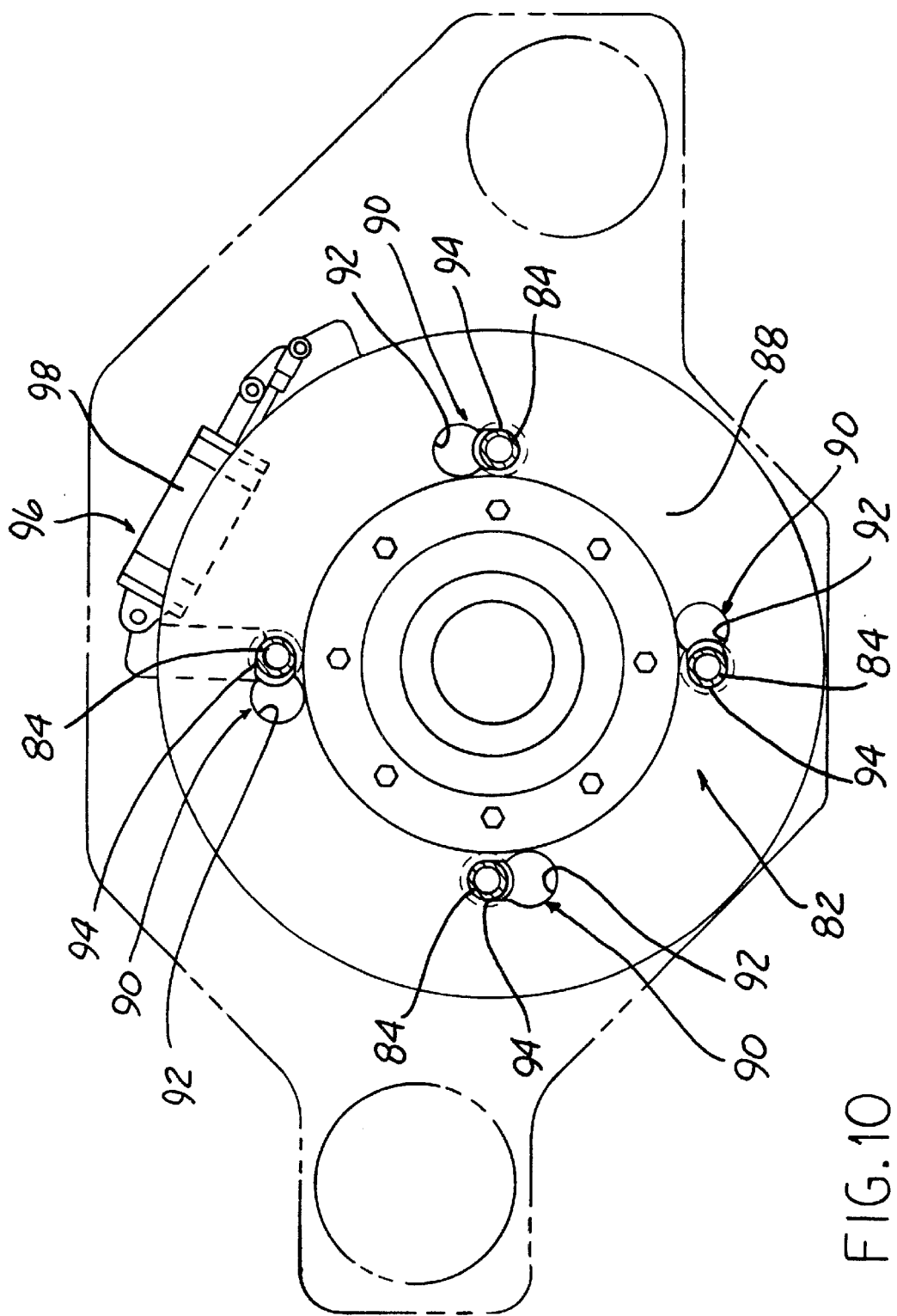
FIG. 10 is a cross sectional view of the reciprocal inflation head taken as shown in FIG. 7.

Means 78 is provided for moving the second circular wall 76 with respect to the first circular wall 74 of the inflation head 68. The moving means 78 can include inflatable bladders or chambers 80 operably connected to the second circular wall 76 for moving the second circular wall 76 with respect to the first circular wall 74 in response to inflation and deflation of the corresponding bladder or chambers or any other suitable motor 80. Means 82 is provided for locking the second circular wall 76 with respect to the inflation head 68 when the second circular wall 76 is in the extended position. The locking means 82 transfers the annular axial force through the second circular wall 76 to deflect the engaged tire sidewall away from the lip of the rim in order to create the inflation chamber used to inflate the tire on the rim. The annular axial force is sufficient to drive the opposing side wall of the tire into sealing engagement with the support surface 24 in order to seal the opposite side of the inflation chamber used to inflate the tire. As best seen in FIGS. 7 and 10, the locking means 82 can include a plurality of rods 84 supporting the inflation head 68 from a movable carriage 86 for movement between the first and second positions. Each rod 84 includes a keyway recess (not shown) formed therein. A plate 88 is operably connected to the second circular wall 76. The plate 88 includes a plurality of apertures 90 formed therein for allowing passage of the plurality of rods 84. Each aperture 90 has an enlarged portion 92 allowing free movement relative to the corresponding rod 84, and a key portion 94 having reduced dimensions operably engagable with the keyway recess in each rod 84, when the second circular wall 76 is in the extended position for locking the second circular wall 76 with respect to the inflation head 68. The plate 88 is moveable rotationally about a central axis to operably engage and disengage the key portion 94 of the apertures 90 with respect to the corresponding keyway recess in each rod 84. Means 96 is provided for moving the plate 88 between an engaged position illustrated in FIG. 10, where the key portion 94 is engaged with the keyway recess of each rod 84, and a disengaged position (not shown) where the enlarged portion 92 of the aperture 90 allows free movement of the plate 88 with respect to the corresponding rods 84. The moving means 96 can include a fluid actuated cylinder 98 or any other suitable drive mechanism.

As best seen in FIGS. 11 and 12, the plate or pallet 24 can include a plurality of upwardly extending concentric annular sealing flanges 100, 102 for operably engaging a lower side wall of the tire in sealing contact to define an inflation chamber in combination with the corresponding annual seals 70, 72 of the inflation head engaging the upper side wall of the tire to be inflated. Depending on the size of the tire to be inflated, the lower side wall of the tire will operably engage at least one of the sealing flanges 100, 102 of the support surface 24 as the corresponding annular seal 70 or 72 for the particular size tire to be inflated is brought into contact with the upper side wall of the tire. After the upper and lower side walls of the tire are sealingly engaged to define the inflation chamber, pressurized fluid, such as compressed air, is communicated with the sealed chamber to inflate the tire on the rim. The inner lower tire seal 100 preferably is tapered to allow the rim centering device to operate and to prevent interference between the wheel and the inner lower tire seal 100 during operation of the rim centering device. The outer lower tire seal can be abrupt.

It should be apparent from the foregoing description that the conveyor 12 and support surface 24 of the present invention can be used with other types of tire inflating equipment, and that the dual ring tire inflation head 68 and moving means 78 for presenting one seal in operable position for engaging a side wall of the tire to be inflated can be used with other types of conveyors and support surfaces. The preferred configuration according to the present invention is to use the disclosed conveyor and support surface in combination with the dual ring tire inflation head and moving means for presenting one seal in operable position for engaging a side wall of the tire to be inflated. However, other conveyors and supporting surfaces in combination with the dual ring tire inflation head and moving means for presenting one seal in operable position for engaging the side wall of the tire to be inflated will be considered to be within the scope of the present invention. The conveyor and splittable support surface according to the present invention in combination with other inflation heads will also be considered to be within the scope of the present invention.

The dual ring inflating head 68 according to the present invention includes a first inner seal ring 70 which is held stationary with respect to the reciprocal inflation head 68 that can be moved vertically by carriage 86 from a first or raised position to a second or lowered position in order to bring the first inner seal 70 into sealing contact with the upper side wall of a tire to be inflated on a wheel rim. When inflating tires of smaller diameter, the second outer seal ring is held in a raised position, with respect to the first inner seal ring, out of engagement with the side wall of the tire to be inflated. The second outer seal 72 is moveable with respect to the inner seal 70 by a plurality of inflatable chambers or any other suitable motors 80 disposed between the upper surface of the first inner seal ring, and the upper wall of a reciprocal housing supporting the second outer seal ring 72. An inflatable chamber 80 is also positioned between the upper surface of the reciprocal housing supporting the second seal ring 72 and the carriage 86 supporting the inflation head 68. This allows movement of the second seal ring 72 between a raised position and a lowered position with respect to the inner seal ring 70. When in the lowered position, the second outer seal ring 72 can be brought into engagement with the upper sidewall of a larger diameter tire to be inflated on a wheel rim by movement of the carriage 86 from the raised position to the lowered position. Due to the high forces existing during inflation of a tire on the wheel rim, it is necessary to hold the reciprocal housing supporting the second outer seal ring 72 in a fixed position relative to the vertically extending support guides. In order to achieve this, the vertically extending support guides or rods 84 include a narrowed diameter or groove or keyway recess adjacent a lower end operably engagable when the reciprocal housing supporting the second outer seal ring 72 is in the lowered position with respect to the first inner seal ring 70. When in this position, the plate 88 is rotated through a predetermined arc to bring reduced diameter key surfaces 94 into operable engagement with the grooves of the vertically extending rods 84 to lock the reciprocal housing supporting the second outer seal ring 72 in the lowered position against the forces present during the inflation process. The upper carriage 86 supporting the first inner seal ring 70 and second outer seal ring 72 for movement between the raised and lowered position is driven in reciprocation by two compressed air operated cylinders. A larger central hydraulic operated cylinder is used to lock the carriage in the desired position against the forces imposed during the inflation process.

The conveyor 12 according to the present invention can include a chain conveyor moveable between a upper position 20 and a lower position 22. When in the upper position, the chain conveyor moves a tire and wheel rim combination to the inflation work station. The central portion 24c of the pallet 24 is raised to an upper position and an actuator 66 drives outwardly rotatable arms 54 into engagement with the wheel rim in order to center the wheel rim and tire with respect to the central portion 24c of the pallet 24. After centering, the central portion 24c of the pallet 24 and conveyor 12 are moved into the lowered position. While being lowered, the outer peripheral portions 24a, 24b of the pallet 24 are moved radially inward toward one another to align complementary interlocking tongue and groove portions for engagement with the central portion 24c of the pallet 24. The tongue and groove portions of the central pallet 24c and outer portions 24a, 24b of the pallet 24 tie the pallet 24 together in order to resist the high forces imposed during the inflation process and in order to seal the pallet pieces with respect to one another so that a seal can be provided with respect to the lower surface of the tire to be inflated. After inflation, the chain conveyor can be raised to the upper position to remove the inflated tire from the inflation workstation, and to present an uninflated tire and wheel rim combination to the workstation to be processed.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for inflating a tire mounted on a rim comprising:

a conveyor for transporting a tire mounted on a rim to a predetermined position at a tire inflating workstation, the conveyor having carrier surfaces spaced laterally with respect to one another along a path of travel for engaging the tire and rim for transport, the carrier surfaces moveable along the path of travel and moveable vertically between a raised transport position and a lowered transfer position; and a support surface at the tire inflating workstation, the support surface having at least two portions, the portions having at least one interlocking joint for holding the portions of the support surface in sealing engagement with respect to one another during an inflation process, at least one portion of the support surface moveable transversely with respect to the path of travel of the conveyor for allowing transfer of the tire and rim transported by the conveyor to the support surface as the conveyor moves between the raised transport position and the lowered transfer position.

2. The apparatus of claim 1 wherein the support surface further comprises:

a central portion and two end portions on opposite sides of the central portion, each end portion having an interlocking joint with respect to the central portion for holding the portions of the support surface in sealing engagement with respect to one another during an inflation process, each end portion moveable transversely toward and away from the central portion for allowing passage of the conveyor between the central portion and the end portions as the conveyor moves between the raised and lowered positions.

3. The apparatus of claim 2 further comprising:

the central portion moveable vertically between a locked position and an unlocked position with respect to the end portions; and means for moving the central portion between the locked and unlocked positions.

4. The apparatus of claim 1 further comprising:

means for moving one portion of the support surface transversely with respect to the other portion of the support surface.

5. The apparatus of claim 1 further comprising:

one portion of the support surface moveable between a locked position and an unlocked position with respect to the other portion of the support surface; and means for moving the one portion between the locked and unlocked positions.

6. The apparatus of claim 1 wherein the conveyor further comprising:

two endless loop conveying surfaces spaced apart from one another and operably engagable with a drive shaft and an idler wheel;

a vertically reciprocal frame supporting the drive shaft and idler wheel, the frame moveable between the raised position and the lowered position; and means for moving the frame between the raised and lowered positions.

7. The apparatus of claim 1 further comprising:

means for moving the carrier surfaces along the path of travel.

8. The apparatus of claim 1 further comprising:

means for communicating pressurized fluid to inflate the tire on the rim, the communicating means including a reciprocal inflation head moveable from a first position spaced from the tire to a second position engagable with a side wall of the tire, the head having at least two concentric seals selectively moveable with respect to one another to bring at least one seal into sealing engagement with a side wall of the tire; and means for moving at least one seal with respect to the other seal for selectively presenting one seal in operable position for engaging a side wall of the tire to be inflated.

9. The apparatus of claim 8 wherein the inflation head further comprises:

a first circular wall extending outwardly from the inflation head and supporting a first seal corresponding to one of the at least two concentric seals for operable engagement with the side wall of the tire to be inflated; and a second circular wall reciprocally mounted with respect to the inflation head for movement between an extended position and a retracted position, and supporting a second seal corresponding to another of the at least two concentric seals for operable engagement with the side wall of the tire to be inflated, the first seal positioned for operable engagement with a first size tire when the second circular wall is in the retracted position, and the second seal positioned for operable engagement with a second size tire when the second circular wall is in the extended position.

10. The apparatus of claim 9 wherein the first size tire is smaller than the second size tire.

11. The apparatus of claim 9 further comprising:

the moving means operable to move the second circular wall with respect to the first circular wall of the inflation head.

12. The apparatus of claim 9 further comprising:

means for locking the second circular wall with respect to the inflation head when the second circular wall is in the extended position.

13. The apparatus of claim 12 wherein the locking means further comprises:

a plurality of rods supporting the inflation head from a carriage for movement between the first and second positions, each rod having a keyway recess formed therein;

a plate operably connected to the second circular wall, the plate having a plurality of apertures formed therein for allowing passage of the plurality of rods, each aperture having an enlarged portion allowing free movement relative to the rod and a key portion operably engagable with the keyway recess in each rod when the second circular wall is in the extended position for locking the second circular wall with respect to the inflation head, the plate moveable to operably engage the key portion with respect to the keyway recess in each rod.

14. The apparatus of claim 13 further comprising:

means for moving the plate between an engaged position where the key portion of each aperture is engaged with the keyway recess of each rod and a disengaged position where the enlarged portion of each aperture allows free movement of the plate with respect to the corresponding rod.

15. An apparatus for inflating a tire mounted on a rim comprising:

a reciprocal inflation head moveable from a first position spaced from the tire to a second position engagable with a side wall of the tire for communicating pressurized fluid to inflate the tire on the rim, the head having at least two concentric seals selectively moveable with respect to one another to independently bring each one of the at least two concentric seals selectively into sealing engagement with a side wall of the tire depending on the size of the tire to be inflated on the rim; and means for moving at least one seal with respect to the other seal for selectively presenting an appropriate one of the at least two concentric seals in operable position for engaging a side wall of the tire to be inflated depending on the size of the tire to be inflated on the rim.

16. An apparatus for inflating a tire mounted on a rim comprising:

a reciprocal inflation head moveable from a first position spaced from the tire to a second position engagable with a side wall of the tire for communicating pressurized fluid to inflate the tire on the rim, the head having at least two concentric seals selectively moveable with respect to one another to bring an appropriate one of the at least two concentric seals selectively into sealing engagement with a side wall of the tire depending on the size of the tire to be inflated on the rim, wherein the inflation head includes a first circular wall extending outwardly from the inflation head and supporting a first seal corresponding to one of the at least two concentric seals for operable engagement with the side wall of the tire to be inflated, and a second circular wall reciprocally mounted with respect to the inflation head for movement between an extended position and a retracted position, and supporting a second seal corresponding to another of the at least two concentric seals for operable engagement with the side wall of the tire to be inflated, the first seal positioned for operable engagement with a first size tire when the second circular wall is in the retracted position, and the second seal positioned for operable engagement with a second size tire when the second circular wall is in the extended position; and means for moving at least one seal with respect to the other seal for selectively presenting one of the at least two concentric seals in operable position for engaging a side wall of the tire to be inflated depending on the size of the tire to be inflated on the rim.

17. The apparatus of claim 16 wherein the first size tire is smaller than the second size tire.

18. The apparatus of claim 16 further comprising:

the moving means operable to move the second circular wall with respect to the first circular wall of the inflation head.

19. The apparatus of claim 16 further comprising:

means for locking the second circular wall with respect to the inflation head when the second circular wall is in the extended position.

20. The apparatus of claim 19 wherein the locking means further comprises:

a plurality of rods supporting the inflation head from a carriage for movement between the first and second positions, each rod having a keyway recess formed therein;

a plate operably connected to the second circular wall, the plate having a plurality of apertures formed therein for allowing passage of the plurality of rods, each aperture having an enlarged portion allowing free movement relative to the rod and a key portion operably engagable with the keyway recess in each rod when the second circular wall is in the extended position for locking the second circular wall with respect to the inflation head, the plate moveable to operably engage the key portion with respect to the keyway recess in each rod.

21. The apparatus of claim 20 further comprising:

means for moving the plate between an engaged position where the key portion of each aperture is engaged with the keyway recess of each rod and a disengaged position where the enlarged portion of each aperture allows free movement of the plate with respect to the corresponding rod.

22. An apparatus for inflating a tire mounted on a rim comprising:

a reciprocal inflation head moveable from a first position spaced from the tire to a second position engagable with a side wall of the tire for communicating pressurized fluid to inflate the tire on the rim, the head having at least two concentric seals selectively moveable with respect to one another to bring an appropriate one of the at least two concentric seals selectively into sealing engagement with a side wall of the tire depending on the size of the tire to be inflated on the rim;

means for moving at least one seal with respect to the other seal for selectively presenting one of the at least two concentric seals in operable position for engaging a side wall of the tire to be inflated depending on the size of the tire to be inflated on the rim;

means for transporting a tire mounted on a rim to a predetermined position at a tire inflating workstation, the transporting means having carrier surfaces spaced laterally with respect to one another along a path of travel for engaging the tire and rim for transport, the carrier surfaces moveable along the path of travel and moveable vertically between a raised transport position and a lowered transfer position; and a support surface at the tire inflating workstation, the support surface having at least two portions, the portions having at least one interlocking joint for holding the portions of the support surface in sealing engagement with respect to one another during an inflation process, at least one portion of the support surface moveable transversely with respect to the path of travel of the conveyor for allowing transfer of the tire and rim transported by the conveyor to the support surface as the conveyor moves between the raised transport position and the lowered transfer position.

23. The apparatus of claim 22 wherein the support surface further comprises:

a central portion and two end portions on opposite sides of the central portion, each end portion having an interlocking joint with respect to the central portion for holding the portions of the support surface in sealing engagement with respect to one another during an inflation process, each end portion moveable transversely toward and away from the central portion for allowing passage of the conveyor between the central portion and the end portions as the conveyor moves between the raised and lowered positions.

24. The apparatus of claim 23 further comprising:

the central portion moveable vertically between a locked position and an unlocked position with respect to the end portions; and means for moving the central portion between the locked and unlocked positions.

25. The apparatus of claim 22 further comprising:

means for moving one portion of the support surface transversely with respect to the other portion of the support surface.

26. The apparatus of claim 22 further comprising:

one portion of the support surface moveable between a locked position and an unlocked position with respect to the other portion of the support surface; and means for moving the one portion between the locked and unlocked positions.

27. The apparatus of claim 22 wherein the transporting means further comprising:

two endless loop conveying surfaces spaced apart from one another and operably engagable with a drive shaft and an idler wheel;

a vertically reciprocal frame supporting the drive shaft and idler wheel, the frame moveable between the raised position and the lowered position; and means for moving the frame between the raised and lowered positions.

28. The apparatus of claim 22 further comprising:

means for moving the carrier surfaces along the path of travel.

29. The apparatus of claim 1 further comprising:

the support surface having a plurality of upwardly extending concentric annular sealing flanges engagable with a lower side wall of a tire to be inflated.

30. The apparatus of claim 22 further comprising:

the support surface having a plurality of upwardly extending concentric annular sealing flanges engagable with a lower side wall of a tire to be inflated.

* * * * *